A. Klein,
Meat Cutter.

No. 93,094. Patented July 27, 1869.

Witnesses:
A. W. Almquist
Geo. W. Mabee

Inventor:
A. Klein
per Munn & Co.
Attorneys.

United States Patent Office.

AUGUST KLEIN, OF NEW YORK, N. Y.

Letters Patent No. 93,094, dated July 27, 1869.

IMPROVED MEAT-CUTTER.

The Schedule referred to in these Letters Patent and making part of the same.

*To all whom it may concern:*

Be it known that I, AUGUST KLEIN, of New York, in the county of New York, and State of New York, have invented a new and improved Sausage-Meat Cutter; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

My invention has for its object to furnish a simple and convenient machine, by means of which the meat may be readily and thoroughly cut, and which shall, at the same time, be easily operated; and It consists in the construction and combination of the various parts of the machine, as hereinafter more fully described.

A is the frame of the machine, which may be made in the form of a box, and divided longitudinally by a partition, $a$, into two compartments, one of which may be used to contain the unchopped, and the other the chopped meat.

B is the chopping-block, in the centre of the lower end of which is formed a hole or socket, to receive the spindle, upon which it revolves, and which is secured to the box or frame A.

Figure 1:
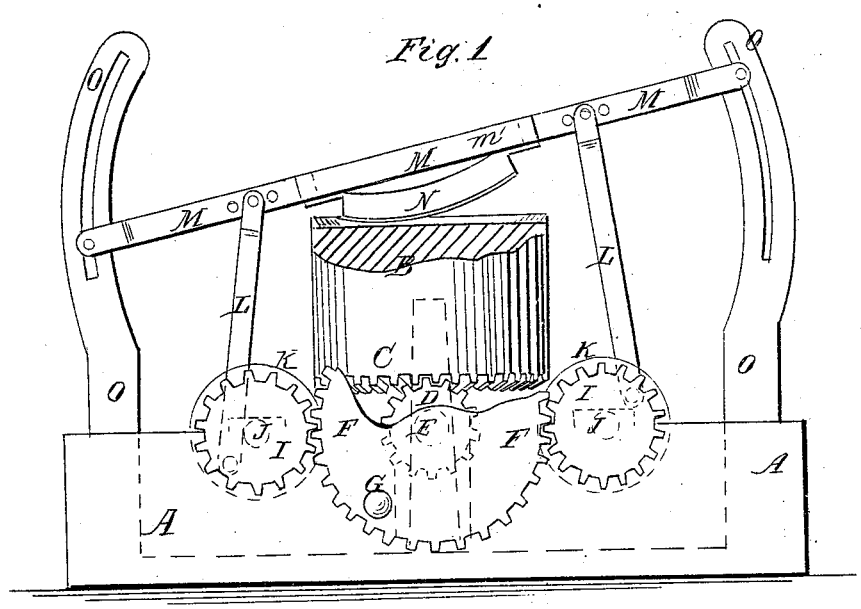
Figure 1 is a side view of my improved machine, parts being broken away to show the construction.
Figure 2:
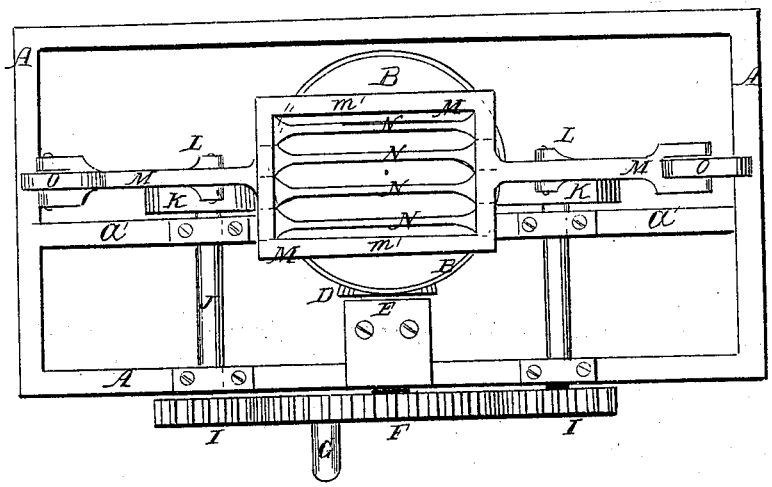
Figure 2 is a top view of the same.

The upper end of the block B is made with a flange around its edge, as shown in figs. 1 and 2, to keep the meat in place while being cut or chopped.

Around the edge of the lower end of the block B is formed, or to it is attached or formed, a gear-wheel, C, into the teeth of which mesh the teeth of the gear-wheel D, attached to the inner end of the shaft E.

The shaft E revolves in bearings in the frame or box A $a'$, and to its outer end is attached a large gear-wheel, F, to which is attached the crank-pin G, by means of which the machine is operated.

Into the teeth of the crank gear-wheel F mesh the teeth of the smaller gear-wheels I, attached to the outer ends of the shafts J, placed, one upon each side of the shaft E, and which revolve in bearings in the box or frame A $a'$.

To the inner ends of the shafts J are attached cranks or crank-wheels K, to the crank-pins of which are pivoted the lower ends of the connecting-rods L, the upper ends of which are adjustably pivoted to the beam M, so that the stroke or throw of said beam may be regulated as desired.

The middle part of the beam M is made in the form of a frame, $m'$, to which is attached a series of curved knives, N, as shown in figs. 1 and 2.

The ends of the beam M are slotted, to receive the curved uprights O, and are provided with guide-pins, which pass through curved slots in the said curved uprights O, to guide the said beam M in its movements.

The lower ends of the uprights O are attached to the box or frame A $a'$.

By this construction and arrangement of the machine, the block B is revolved at the same time and by the same operation by which the knives or cutters N are rocked, so that the said knives may operate each time upon a different part of the meat.

Having thus described my invention,

I claim as new, and desire to secure by Letters Patent—

The combination of the series of curved knives N, beam M $m'$, curved uprights or guides O, connecting-rods L, cranks or crank-wheels K, shafts J, and gear-wheels I, with each other, with the revolving block B, and with the crank gear-wheel G F, from which the block B is revolved, substantially as herein shown and described, and for the purpose set forth.

The above specification of my invention signed by me, this 2d day of June, 1869.

AUGUST KLEIN.

Witnesses:
 FRANK BLOCKLEY,
 JAMES T. GRAHAM.